(12) United States Patent
Elliott et al.

(10) Patent No.: US 8,384,616 B2
(45) Date of Patent: *Feb. 26, 2013

(54) ISOLATING ALIGNMENT AND STRUCTURAL STRENGTH IN LED DISPLAY SYSTEMS

(75) Inventors: Grant Arthur John Elliott, Tai Po (HK); Marcus Robert Patterson, Auckland (NZ)

(73) Assignee: Barco, Inc., Duluth, GA (US)

( * ) Notice: Subject to any disclaimer, the term of this patent is extended or adjusted under 35 U.S.C. 154(b) by 844 days.

This patent is subject to a terminal disclaimer.

(21) Appl. No.: 12/424,338

(22) Filed: Apr. 15, 2009

(65) Prior Publication Data

US 2010/0090934 A1 Apr. 15, 2010

Related U.S. Application Data

(62) Division of application No. 61/045,230, filed on Apr. 15, 2008.

(51) Int. Cl.
*G09G 5/00* (2006.01)
(52) U.S. Cl. .............. 345/1.3; 345/1.1; 345/39; 345/82
(58) Field of Classification Search .................. None
See application file for complete search history.

(56) References Cited

U.S. PATENT DOCUMENTS

| | | | |
|---|---|---|---|
| 4,209,934 A | 7/1980 | Ogawa | |
| 5,128,662 A | 7/1992 | Failla | |
| 5,410,328 A | 4/1995 | Yoksza et al. | |
| 6,029,831 A | 2/2000 | Miller | |
| 6,252,564 B1 | 6/2001 | Albert et al. | |
| 6,314,669 B1 | 11/2001 | Tucker | |
| 6,498,592 B1 | 12/2002 | Matthies | |
| 6,704,989 B1 | 3/2004 | Lutz et al. | |
| 6,813,853 B1 | 11/2004 | Tucker | |
| 7,071,620 B2 | 7/2006 | Devos et al. | |
| 7,102,601 B2 | 9/2006 | Devos et al. | |
| 7,362,046 B2 * | 4/2008 | Aston | 313/498 |
| 7,766,508 B2 | 8/2010 | Villard et al. | |
| 8,007,121 B2 * | 8/2011 | Elliott et al. | 362/97.1 |
| 2002/0003592 A1 | 1/2002 | Hett et al. | |
| 2002/0097967 A1 | 7/2002 | Lowry | |
| 2002/0154259 A1 | 10/2002 | Freidhoff et al. | |
| 2002/0168157 A1 | 11/2002 | Walker et al. | |
| 2003/0016227 A1 | 1/2003 | Matthies | |
| 2005/0178034 A1 | 8/2005 | Schubert et al. | |
| 2005/0225733 A1 | 10/2005 | Dwyer et al. | |
| 2005/0278998 A1 | 12/2005 | Sawhney et al. | |
| 2006/0044215 A1 | 3/2006 | Brody et al. | |
| 2006/0290596 A1 | 12/2006 | Kweon et al. | |

(Continued)

FOREIGN PATENT DOCUMENTS

EP 1365376 11/2003
EP 1524640 A2 4/2005

(Continued)

*Primary Examiner* — Muhammad N Edun
(74) *Attorney, Agent, or Firm* — Aka Chan LLP

(57) ABSTRACT

A display system, a method of constructing a display system, and a method of displaying an image are provided. In one embodiment, a display system includes a support structure having a plurality of attachment members and a plurality of tiles. Each of the plurality of tiles is attached to a corresponding attachment member of the plurality of attachment members. The support structure is configured to structurally support each of the plurality of tiles, and at least one of the plurality of tiles includes at least one connection configured to removably connect and align the at least one of the plurality of tiles with another one of the plurality of tiles.

25 Claims, 4 Drawing Sheets

U.S. PATENT DOCUMENTS

| | | |
|---|---|---|
| 2007/0000849 A1 | 1/2007 | Lutz et al. |
| 2007/0252056 A1 | 11/2007 | Novin |
| 2008/0037284 A1 | 2/2008 | Rudisill |
| 2008/0278998 A1 | 11/2008 | Cowburn et al. |
| 2009/0034241 A1 | 2/2009 | Coushaine et al. |
| 2009/0310065 A1 | 12/2009 | Dunn |

FOREIGN PATENT DOCUMENTS

| | | |
|---|---|---|
| FR | 2797341 A1 | 2/2001 |
| JP | 8-314014 | 11/1996 |

* cited by examiner

ISOLATING ALIGNMENT AND STRUCTURAL STRENGTH IN LED DISPLAY SYSTEMS

CROSS-REFERENCE TO RELATED APPLICATIONS

The present application claims priority to U.S. Provisional Application No. 61/045,230, filed Apr. 15, 2008, the full disclosure of which is incorporated by reference herein for all purposes.

The present application is related to co-pending U.S. patent application Ser. No. 12/424,360 filed concurrently herewith as by the same inventors and incorporated by reference herein for all purposes.

TECHNICAL FIELD OF THE DISCLOSURE

This disclosure generally relates to display units and particularly to a display system comprising groups of light emitting elements mounted to a support structure such that the display system may be easily installed and/or reconfigured while retaining both strength and positional accuracy.

BACKGROUND OF THE DISCLOSURE

Display systems for entertainment, architectural, and advertising purposes have commonly been constructed of numbers of light emitting elements such as LEDs or incandescent lamps mounted onto flat tiles. The light emitting elements can be selectively turned on and off to create patterns, graphics, and/or video displays for both informational and aesthetic purposes. It is well known to construct these displays as tiles or large panels which are assembled in position for a specific entertainment show or event or as an architectural or advertising display. Examples of such systems are disclosed in U.S. Pat. Nos. 6,813,853, 6,704,989 and 6,314,669, the disclosures of which are incorporated by reference herein for all purposes.

It can be a requirement of an event or theatrical production to use such a display but to have the display easily removable, for example in between scenes of a play or theatrical event, as the needs of the production dictate. Systems may use a tile based structure where a tile, typically around 2 ft×2 ft, can be lifted by hand and positioned. Accurate positioning of the tiles may be a time consuming and complex process involving skilled personnel.

Displays of these types may be constructed at different resolutions where the spacing between the light emitting elements can be varied. It may also be a requirement to change this spacing at different points on the display. Such systems are disclosed in U.S. Pat. Nos. 5,410,328, 7,102,601 and 7,071,620, the disclosures of which are incorporated by reference herein for all purposes. Further prior art systems, such as the VersaPixel manufactured by Element Labs, Inc. or the MiSphere system manufactured by Barco, may use suspended light emitting elements to be used as a ceiling or roof to an area. It would be advantageous to have a support and installation structure for such displays that is simple to install and that facilitates use in differing resolutions and on different planes through a single structure.

Small errors in the positioning of the pixels within tiles and tiles within a display can be cumulative and may lead to large errors in overall pixel alignment accuracy. At the same time the display support system must be strong enough to support a large area of display tiles and to withstand side loads from wind and weather if used outside. The goal of simultaneous strength, rigidity and accuracy is one that is commonly not achieved in prior art systems and the user typically has to accept a reduced accuracy in order to achieve the required strength. Accordingly, there exists a need for a display system that may be easily installed and/or reconfigured while retaining both strength and positional accuracy.

DETAILED DESCRIPTION

Figure 1:
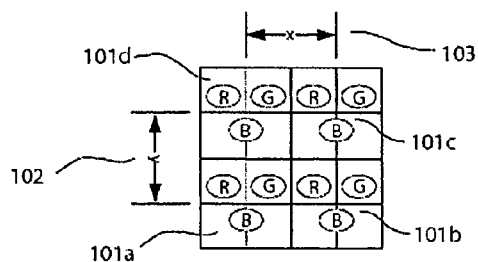
FIG. 1 shows pixels of a prior display system.

FIG. 1 shows pixels of a display system in accordance with the prior art. Each pixel 101a, 101b, 101c, 101d may be constructed from 3 LEDs; e.g., red (R), green (G) and blue (B). The distance 103 and 102 between the center of a pixel and its adjacent pixels is referred to as the pixel pitch. The x-axis pixel pitch 103 may be substantially the same as the y-axis pixel pitch 102.

In a large display with a large number of pixels it is critical that the pixel pitch is controlled within tight tolerances. Errors in the pixel pitch across the display are very apparent to the viewer and adversely affect the image quality.

Figure 2:
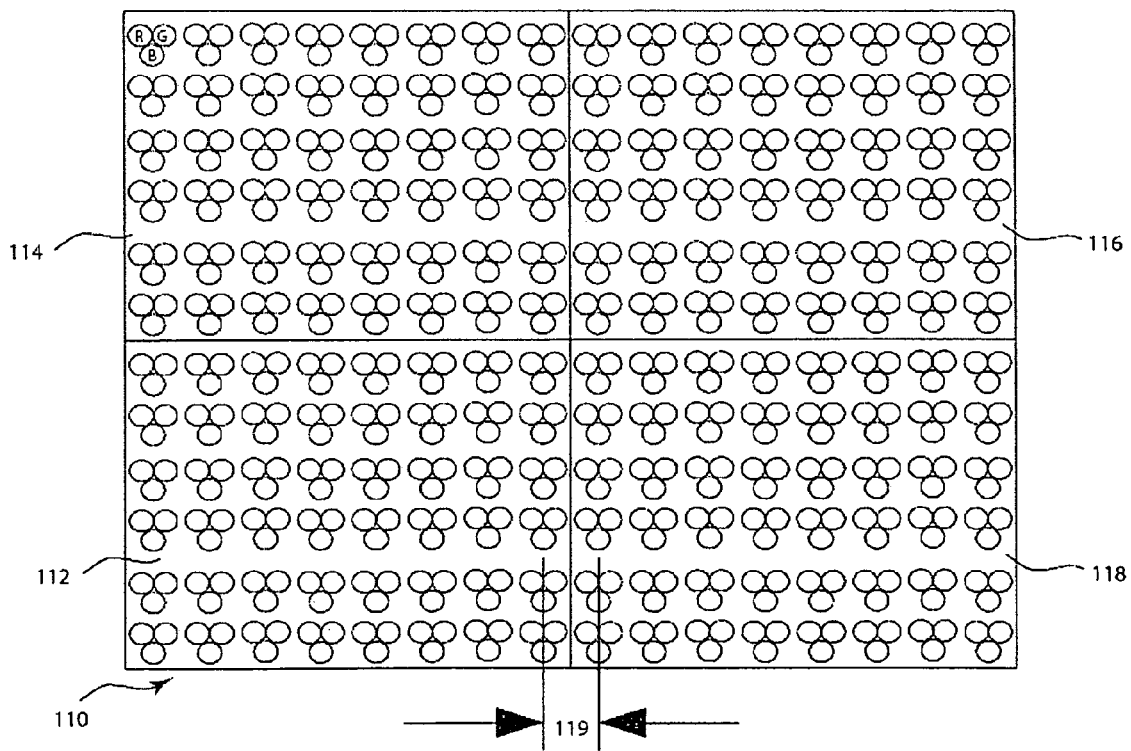
FIG. 2 shows a portion of a prior modular display system.

FIG. 2 illustrates a portion of a modular display system 110 in accordance with the prior art, where display modules 112, 114, 116, 118 are mounted adjacent to each other to form a single display. Methods to control pixel alignment and pitch within a single module are well known in the art through such means as accurate component placement on a printed circuit board within the module housing. The modules may be constructed from plastic, and be sufficiently small that the tolerances within the modules can be tightly controlled.

However the pitch 119 between the pixels on adjacent modules is controlled by the accurate mechanical alignment and spacing of the individual modules. If this alignment and spacing is not accurately maintained gaps may appear in the display which appear darker when the screen is set to black. Additionally, banding can appear due to perceived luminance errors. For example, if the pixel pitch between modules is greater than the pixel pitch within the module, then the effective area subtended to the viewer by the pixels at the boundary is larger than those within the module. This increased effective area causes the perceived luminance of the pixels at the boundaries of the modules to be lower than the pixels within the module causing an apparent band or stripe in the image.

In the prior art, modular display systems may include a number of display modules mounted onto a larger tile in which these tiles are connected together to form the entire screen. The tiles are typically constructed from folded sheet metal, and are large compared to the modules. These tiles and their interconnection provide both the alignment of the display modules and the structural support and strength to form the mechanical infrastructure of the screen. If a screen is intended for an outdoor application then it must further be able to withstand wind loadings producing significant sideways forces.

Figure 3:
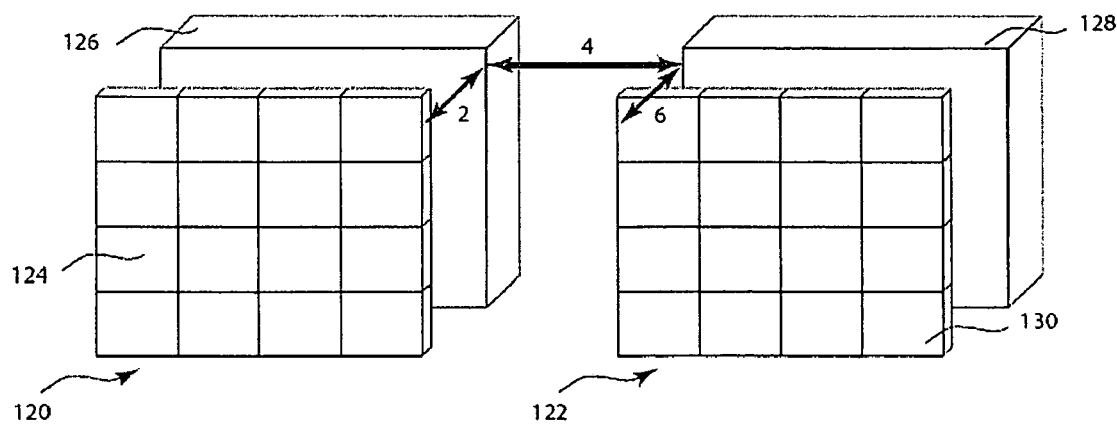
FIG. 3 shows a prior modular display system.

FIG. 3 shows a modular display system in accordance with the prior art. A plurality of display modules 124 are assembled onto a support structure 126 to form tile 120, and a second plurality of display modules 130 are assembled onto support structure 128 to form a second tile 122. Support structures 126 and 128 are interconnected to support and align the two tiles. The alignment of the display modules 124 on tile 120 with display modules 130 on tile 122 are affected by multiple and cumulative tolerances: tolerance 2 between tile 120 and support structure 126, tolerance 4 between support structure 126 and support structure 128, and tolerance 6 between support structure 128 and tile 122.

In the prior art system such tolerances may accumulate and produce a total positional error as high as ±8.25% (total 16.5%) resulting in visible and objectionable luminance difference between the pixels at the tile boundaries and the pixels within the tile. Such a gap between tiles will be noticeable to an observer and detract from a cohesive look. Although here we are referring to tolerances in a single axis, it is also important to note that these tolerances may be present and important in all three perpendicular axes x, y, and z.

The prior art uses the support structure 126, 128 to provide both:
  alignment—ensuring that the tiles align to form a cohesive display; and
  structural support—ensuring that the screen can support itself safely as well as endure additional forces, such as from wind loading in outdoor situations.

Alignment accuracy is the primary requirement for display quality, but the large structural parts needed to simultaneously achieve the strength goals may hinder that accuracy. Achieving the tight tolerances needed with large structural components can be difficult and expensive, and almost always involves large amounts of time consuming and expensive machining.

Figure 4:
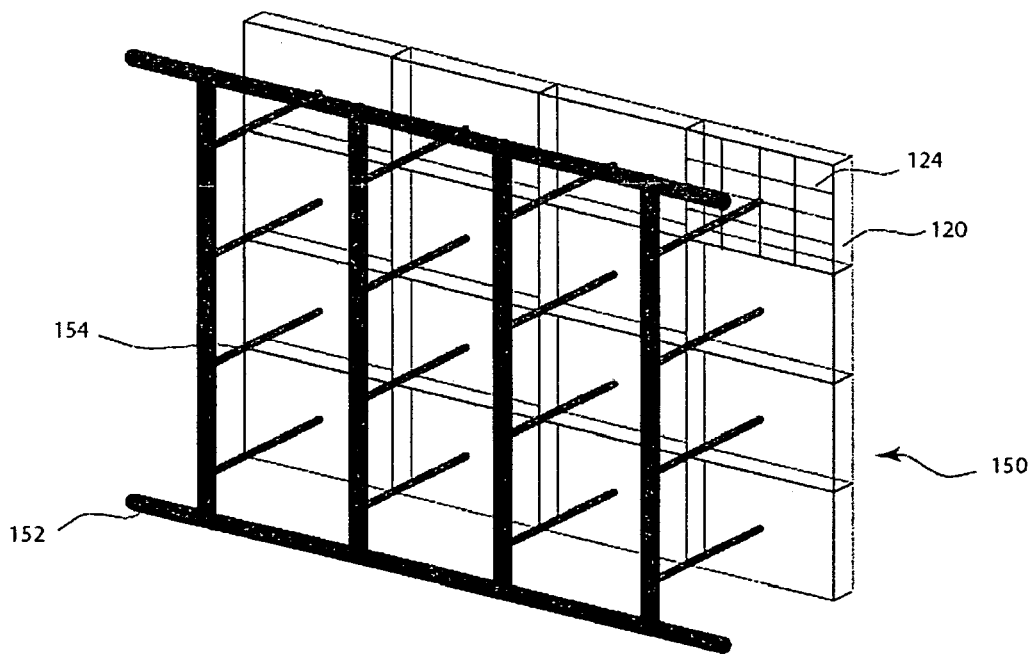
FIG. 4 shows a display system in accordance with embodiments of the present disclosure.

The present disclosure improves on the prior art and discloses means for assembling a modular display which isolate the alignment and structural requirements/functionality from each other. FIG. 4 shows a display system 150 in accordance with embodiments of the present disclosure. Multiple display modules 124 are assembled onto a plurality of tiles 120 (without the use of support structures 126, 128). Tiles 120 may connect to adjacent tiles through at least one connection that may include clips or clamps which provide accurate and improved alignment without having a requirement (or a substantially low requirement) to provide support or strength to the system. Substantially removing the strength requirement from these components allows smaller, more accurately manufactured parts to be used and ensure highly accurate alignment. The tiles may be manufactured using injection molding or other techniques well known in the art which have inherently high levels of accuracy, as compared to the sheet metal and machining techniques used in the prior art. Thus, the video display will be accurately aligned and cohesive in its appearance.

Structural support and strength is provided though a secondary structural support 152 which is connected to the display tiles through attachment member 154 such that the alignment of the display tiles remains uncompromised. In one example, attachment member 154 includes an interconnecting member, such as a rod, and a spigot at the end of the rod, which operably couples to a tile 120. The secondary structural support 152 provides the strength required to support itself and the display tiles and to resist other applied forces such as wind loading.

To ensure that any inaccurate alignment of structural support 152 does not compromise or affect the alignment of the display tiles 120, the attachment members 154 may be constructed so as to take up or nullify any tolerance difference between the accurately aligned display tiles 120 and the structural support 152. Alignment accuracies up to an order of magnitude better than the prior art system can be provided by the separation of the functions of alignment and support. For example, in one embodiment, the attachment member 154 may be moveable or deformable in any direction with respect to the structural support 152.

Figure 5:
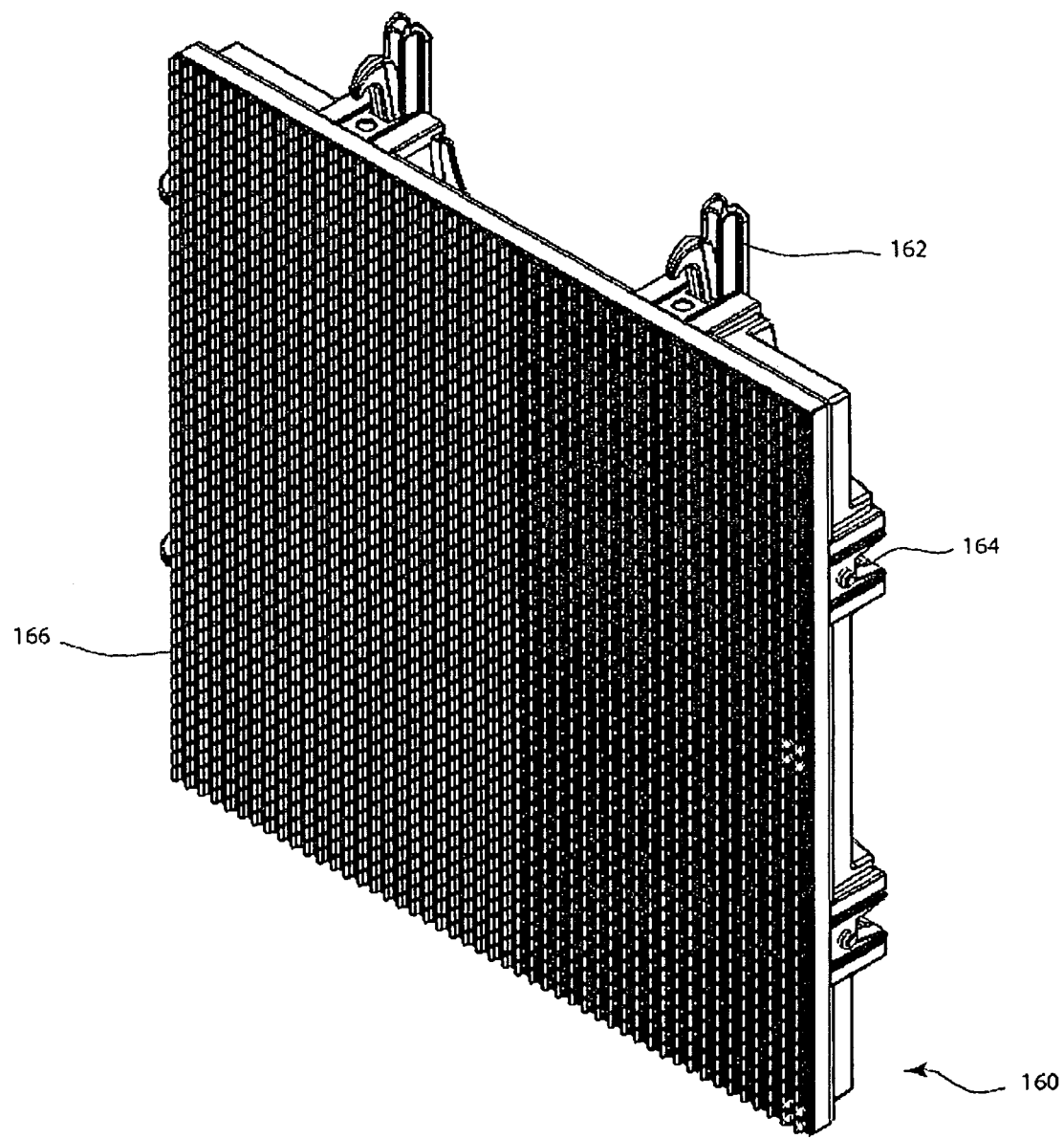
FIG. 5 shows an isometric view of a tile of a display system in accordance with embodiments of the present disclosure.

FIG. 5 shows an isometric view of a tile 160 of a display system in accordance with embodiments of the present disclosure. A plurality of pixels 166 are mounted onto a display tile 160. Display tile 160 is accurately constructed to very tight tolerances and may use injection molding or other inherently accurate manufacturing technique. The strength requirement for tile 160 is minimal, as it only needs to support itself and the attached pixels and associated circuitry. There is no requirement to provide support for adjacent tiles. Alignment between adjacent tiles 160 is provided through connections such as clips 162 and receptacles 164 in one example. Clips 162 and receptacles 164 provide highly accurate alignment of adjacent tiles 160 with no or a substantially low requirement to transmit support or strength between those tiles. This allows the use of accurate construction to very tight tolerances which may use injection molding or other inherently accurate manufacturing technique.

Figure 6:
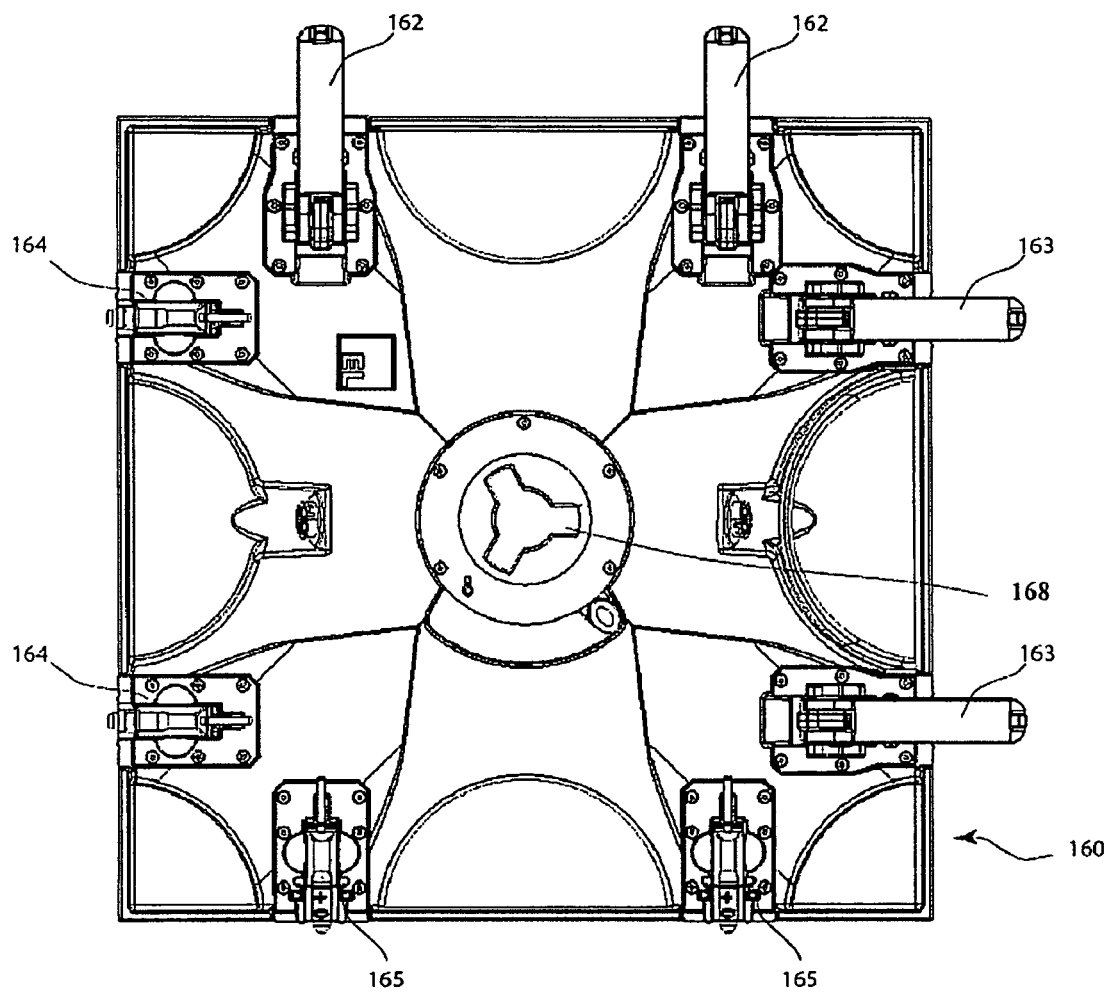
FIG. 6 shows a rear view of a tile of a display system in accordance with embodiments of the present disclosure.

FIG. 6 shows a rear view of a tile of a display system in accordance with embodiments of the present disclosure. Clips 162 on the top of a tile may connect to receptacles 165 on the bottom of the adjacent tile. Similarly clips 163 on the right of a tile may connect to receptacles 164 on the left side of the adjacent tile. Strength and support for tile 160 is provided through center attachment point 168 which connects to the attachment member 154 (FIG. 4) back to the structural support 152 (FIG. 4). Through such means a modular display of any size may be quickly and accurately constructed.

In certain embodiments, the tiles (e.g., tiles 120 or 160) may include a Printed Circuit Board (PCB) that allows a plurality of light emitting elements to be electronically connected to the tile. Further, in certain embodiments, the display system 150 (FIG. 4) may also include a power unit and/or a main processor that is electronically connected to the plurality of light emitting elements. As such, the power unit and/or the main processor may send a data and/or power signal to the plurality of light emitting elements disposed on the tiles. Based on the power signal, the plurality of light emitting elements may be selectively powered on and off or emit light with varying intensities, and based on the data signal, the plurality of light emitting elements may selectively emit light of different colors.

Advantageously, the present disclosure provides a comprehensive display system and support structure capable of providing both strength and rigidity while also presenting a high level of accuracy for tile and pixel placement.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:
1. A display system, comprising:
  a support structure having a plurality of attachment members; and
  a plurality of tiles, wherein each of the plurality of tiles is attached to a corresponding attachment member of the plurality of attachment members, wherein the support structure is configured to structurally support each of the plurality of tiles and the support structure is separable from the plurality of tiles, wherein at least one of the plurality of tiles includes at least one connection configured to removably connect and align the at least one of the plurality of tiles with another one of the plurality of tiles.

2. The display system of claim 1, wherein at least one of the plurality of attachment members is moveable with respect to the support structure.

3. The display system of claim 1, wherein at least one of the plurality of tiles includes a plurality of display modules.

4. The display system of claim 3, wherein at least one of the plurality of display modules includes at least one light emitting device.

5. The display system of claim 1, wherein the at least one of the plurality of tiles includes an attachment point configured to allow the at least one of the plurality of tiles to be removably attached to at least one of the plurality of attachment members.

6. The display system of claim 1, wherein the at least one connection includes at least one of a receptacle and a clip.

7. The display system of claim 1, wherein the at least one of the plurality of tiles with another one of the plurality of tiles are held at different angles with respect to the support structure.

8. The display system of claim 1 wherein the at least one connection does not removably couple with the support structure.

9. A display system, comprising:
a support structure having a plurality of attachment members; and
a plurality of tiles, wherein each of the plurality of tiles is attached to a corresponding attachment member of the plurality of attachment members,
wherein the support structure is configured to structurally support each of the plurality of tiles,
wherein the support structure includes a plastic material, and
wherein at least one of the plurality of tiles includes at least one connection configured to removably connect and align the at least one of the plurality of tiles with another one of the plurality of tiles.

10. A method of constructing a display system, the method comprising:
providing a support structure having a plurality of attachment members;
providing a plurality of tiles;
attaching each of the plurality of tiles to a corresponding attachment member of the plurality of attachment members, wherein the support structure is configured to structurally support the plurality of tiles; and
connecting at least one of the plurality of tiles with another one of the plurality of tiles through at least one connection configured to align the at least one of the plurality of tiles with the another one of the plurality of tiles, wherein the plurality of attachment members is a separate structure from the at least one connection.

11. The method of claim 10, further comprising attaching a plurality of display modules onto at least one of the plurality of tiles, wherein at least one of the plurality of display modules includes at least one light emitting device.

12. The method of claim 10, further comprising moving the at least one of the plurality of tiles relative to the another one of the plurality of tiles.

13. The method of claim 10, further comprising moving at least one of the plurality of attachment members with respect to the support structure.

14. The method of claim 10, wherein the each of the plurality of tiles can be rotated three-hundred sixty degrees with respect to its corresponding attachment member.

15. The method of claim 10, wherein the attaching each of the plurality of tiles to a corresponding attachment member includes each of the plurality of tiles removably coupled to at most one attachment member.

16. A method of displaying an image, the method comprising:
providing a support structure having a plurality of attachment members;
providing a plurality of tiles;
attaching each of the plurality of tiles to a corresponding attachment member of the plurality of attachment members, wherein the support structure is configured to structurally support the plurality of tiles
connecting at least one of the plurality of tiles with another one of the plurality of tiles through at least one connection configured to align the at least one of the plurality of tiles with the another one of the plurality of tiles, wherein the support structure and the at least one connection are separate;
electrically connecting the plurality of tiles to at least one of a power supply and a main processor; and
sending a signal from at least one of the power supply and the main processor to the plurality of tiles, wherein a light emitting device that is coupled to at least one of the plurality of tiles is configured to emit light based on the signal.

17. The method of claim 16, wherein the signal includes at least one of a power signal and a data signal.

18. The method of claim 16, further comprising attaching a plurality of display modules onto at least one of the plurality of tiles, wherein at least one of the plurality of display modules includes at least one light emitting device.

19. The method of claim 16, further comprising moving the at least one of the plurality of tiles relative to the another one of the plurality of tiles.

20. The method of claim 16, further comprising moving at least one of the plurality of attachment members with respect to the support structure.

21. The method of claim 16, wherein the support structure includes at least one vertical bar.

22. The method of claim 21, wherein the at least one vertical bar is removably coupled to at least three tiles of the plurality of tiles.

23. The method of claim 16, wherein the plurality of tiles includes light-emitting elements arranged as pixels and each pixel comprising at least three light emitting diodes.

24. The method of claim 23, wherein the at least three light emitting diodes are a different color.

25. The method of claim 23, wherein the plurality of tiles form a first video display side.

* * * * *